(12) United States Patent
Salavon

(10) Patent No.: US 10,803,347 B2
(45) Date of Patent: Oct. 13, 2020

(54) IMAGE TRANSFORMATION WITH A HYBRID AUTOENCODER AND GENERATIVE ADVERSARIAL NETWORK MACHINE LEARNING ARCHITECTURE

(71) Applicant: The University of Chicago, Chicago, IL (US)

(72) Inventor: Jason Salavon, Chicago, IL (US)

(73) Assignee: The University of Chicago, Chicago, IL (US)

( * ) Notice: Subject to any disclaimer, the term of this patent is extended or adjusted under 35 U.S.C. 154(b) by 103 days.

(21) Appl. No.: 16/206,538

(22) Filed: Nov. 30, 2018

(65) Prior Publication Data

US 2019/0171908 A1    Jun. 6, 2019

Related U.S. Application Data

(60) Provisional application No. 62/593,354, filed on Dec. 1, 2017, provisional application No. 62/633,851, filed on Feb. 22, 2018.

(51) Int. Cl.
*G06K 9/62* (2006.01)
*G06F 16/55* (2019.01)
*G06N 3/08* (2006.01)
*G06N 3/04* (2006.01)
*G06F 16/583* (2019.01)

(52) U.S. Cl.
CPC .......... *G06K 9/6215* (2013.01); *G06F 16/55* (2019.01); *G06F 16/583* (2019.01);
(Continued)

(58) Field of Classification Search
CPC ........ G06F 16/55; G06K 9/46; G06K 9/6215; G06K 9/6232
See application file for complete search history.

(56) References Cited

U.S. PATENT DOCUMENTS

| 7,565,028 | B2 * | 7/2009 | Saed | G06K 9/64 |
| | | | | 345/629 |
| 2016/0055627 | A1 * | 2/2016 | Shibata | G06K 9/6212 |
| | | | | 382/254 |

(Continued)

OTHER PUBLICATIONS

Kingma et al., "Adam: A Method for Stochastic Optimization", Conference paper at ICLR, 2015, 15 pages.

(Continued)

*Primary Examiner* — John J Lee
(74) *Attorney, Agent, or Firm* — McDonnell Boehnen Hulbert & Berghoff LLP

(57) ABSTRACT

An encoder artificial neural network (ANN) may be configured to receive an input image patch and produce a feature vector therefrom. The encoder ANN may have been trained with a first plurality of domain training images such that an output image patch visually resembling the input image patch can be generated from the feature vector. A generator ANN may be configured to receive the feature vector and produce a generated image patch from the first feature vector. The generator ANN may have been trained with feature vectors derived from a first plurality of domain training images and a second plurality of generative training images such that the generated image patch visually resembles the input image patch but is constructed of a newly-generated image elements visually resembling one or more image patches from the second plurality of generative training images.

20 Claims, 12 Drawing Sheets

(52) U.S. Cl.
CPC ......... *G06K 9/6232* (2013.01); *G06N 3/0454* (2013.01); *G06N 3/08* (2013.01)

(56) References Cited

U.S. PATENT DOCUMENTS

2016/0307071 A1* 10/2016 Perronnin ................ G06K 9/66
2018/0211401 A1*  7/2018 Lee ........................ G06T 7/593

OTHER PUBLICATIONS

Kwak et al., "Generating Images Part by Part with Composite Generative Adversarial Networks", School of Computer Science and Engineering, Seoul National University, Seoul, Korea, 2016, 7 pages.

Sanakoyeu et al., "A Style-Aware Content Loss for Real-time HD Style Transfer", Heidelberg Collaboratory for Image Processing, IWR, Heidelberg University, Germany, 2018, 22 pages.

Goodfellow et al., "Generative Adversarial Nets", Department d'informatique et de recherche operationnelle, Universite de Montreal, 2014, 9 pages.

"An Introduction to Generative Adversarial Networks (with code in TensorFlow)", Aylien.com, http://blog.aylien.com/introduction-generative-adversarial-networks-code-tensorflow/1/, 2016, 26 pages.

"CS231n Convolutional Neural Networks for Visual Recognition", http://cs231n.github.io/convolutional-networks/, printed 2017, 23 pages.

"Generative Adversarial Network", Wikipedia, https://en.wikipedia.org/wiki/Generative_adversarial_network, printed 2017, 3 pages.

* cited by examiner $$
\begin{array}{|c|c|c|}
\hline
4 & 3 & 4 \\
\hline
3 & 4 & 3 \\
\hline
4 & 2 & 2 \\
\hline
\end{array}
\leftarrow 624
$$

$$=$$

$$
\begin{array}{|c|c|c|}
\hline
1 & 0 & 1 \\
\hline
0 & 1 & 0 \\
\hline
1 & 0 & 1 \\
\hline
\end{array}
\leftarrow 622
$$

$$*$$

$$
\begin{array}{|c|c|c|c|c|}
\hline
0 & 0 & 1 & 0 & 0 \\
\hline
0 & 1 & 1 & 1 & 0 \\
\hline
1 & 1 & 1 & 1 & 1 \\
\hline
1 & 1 & 0 & 0 & 1 \\
\hline
1 & 0 & 0 & 0 & 0 \\
\hline
\end{array}
\leftarrow 620
$$

FIG. 6B

TRAIN AN AUTOENCODER WITH A FIRST PLURALITY OF DOMAIN TRAINING IMAGES, WHEREIN THE AUTOENCODER INCLUDES: AN ENCODER ARTIFICIAL NEURAL NETWORK (ANN) CONFIGURED TO RECEIVE AN INPUT IMAGE PATCH FROM AN IMAGE OF THE FIRST PLURALITY OF DOMAIN IMAGES AND PRODUCE A FIRST FEATURE VECTOR THEREFROM, AND A DECODER ANN CONFIGURED TO RECEIVE THE FIRST FEATURE VECTOR AND PRODUCE AN OUTPUT IMAGE PATCH THEREFROM, WHEREIN THE AUTOENCODER TRAINING IS BASED ON A FIRST LOSS FUNCTION THAT CALCULATES A FIRST DIFFERENCE BETWEEN THE INPUT IMAGE PATCH AND THE OUTPUT IMAGE PATCH ← 900

TRAIN A DISCRIMINATOR ANN OF A GENERATIVE ADVERSARIAL NETWORK, WHEREIN THE GENERATIVE ADVERSARIAL NETWORK INCLUDES A GENERATOR ANN CONFIGURED TO RECEIVE THE FIRST FEATURE VECTOR AND PRODUCE A GENERATED IMAGE PATCH FROM THE FIRST FEATURE VECTOR, AND THE DISCRIMINATOR ANN, WHEREIN THE DISCRIMINATOR ANN IS CONFIGURED TO RECEIVE THE GENERATED IMAGE PATCH AND A PARTICULAR GENERATIVE TRAINING IMAGE OF A SECOND PLURALITY OF GENERATIVE TRAINING IMAGES, AND PROVIDE CLASSIFICATIONS THEREOF PREDICTING WHETHER THE GENERATED IMAGE PATCH BELONGS TO THE SECOND PLURALITY OF GENERATIVE TRAINING IMAGES, WHEREIN THE DISCRIMINATOR ANN TRAINING IS BASED ON A SECOND LOSS FUNCTION THAT CALCULATES A SECOND DIFFERENCE BETWEEN THE CLASSIFICATION OF THE GENERATED IMAGE PATCH AND THE CLASSIFICATION OF THE PARTICULAR GENERATIVE TRAINING IMAGE ← 902

TRAIN THE GENERATOR ANN, WHEREIN THE ENCODER ANN IS ALSO CONFIGURED TO RECEIVE THE GENERATED IMAGE PATCH AND PRODUCE A SECOND FEATURE VECTOR THEREFROM, AND WHEREIN THE GENERATOR ANN TRAINING IS BASED ON A THIRD LOSS FUNCTION THAT CALCULATES A THIRD DIFFERENCE BETWEEN (I) THE CLASSIFICATION OF THE GENERATED IMAGE PATCH AND (II) A FOURTH DIFFERENCE BETWEEN THE FIRST FEATURE VECTOR AND THE SECOND FEATURE VECTOR ← 904

FIG. 9

IMAGE TRANSFORMATION WITH A HYBRID AUTOENCODER AND GENERATIVE ADVERSARIAL NETWORK MACHINE LEARNING ARCHITECTURE

CROSS-REFERENCE TO RELATED APPLICATIONS

This application claims priority to U.S. provisional patent application Nos. 62/593,354, filed Dec. 1, 2017, and 62/633,851, filed Feb. 22, 2018, both of which are hereby incorporated by reference in their entirety.

BACKGROUND

Image processing has used artificial neural networks (ANNs) for some time to produce visual effects. These effects may involve improving the quality of an input image, or creating an artistic rendering of the input image. Most of these techniques, however, use conventional ANN architectures, such as convolutional neural networks (CNNs), and achieve their improvements through the use of deep learning over larger and larger ANNs. Thus, these improvements are often contingent on access to increasing amounts of processing power, rather than the structure of the ANN itself.

SUMMARY

The embodiments herein introduced a new ANN architecture, the hybrid autoencoder and generative adversarial network (also referred to as a yGAN). This architecture involves training an encoder ANN and a generator ANN to produce image patches that resemble the structure of an input image patch but are composed of synthetic elements that resemble those of a secondary set of images. The training involves an autoencoder including the encoder ANN and a generative adversarial network including the generator ANN. In addition to these artistic renderings, in certain embodiments the system is also able to colorize, de-noise, de-blur, and increase the resolution of images.

Accordingly, a first example embodiment may involve training an autoencoder with a first plurality of domain training images. The autoencoder may include: an encoder ANN configured to receive an input image patch from an image of the first plurality of domain training images and produce a first feature vector therefrom, and a decoder ANN configured to receive the first feature vector and produce an output image patch therefrom. The autoencoder training may be based on a first loss function that calculates a first difference between the input image patch and the output image patch. The first example embodiment may also involve training a discriminator ANN of a generative adversarial network. The generative adversarial network may include a generator ANN configured to receive the first feature vector and produce a generated image patch from the first feature vector, and the discriminator ANN. The discriminator ANN may be configured to receive the generated image patch and a particular generative training image of a second plurality of generative training images, and provide classifications thereof predicting whether the generated image patch belongs to the second plurality of generative training images. The discriminator ANN training may be based on a second loss function that calculates a second difference between the classification of the generated image patch and the classification of the particular generative training image. The first example embodiment may also involve training the generator ANN. The encoder ANN may also be configured to receive the generated image patch and produce a second feature vector therefrom. The generator ANN training may be based on a third loss function that calculates a third difference between (i) the classification of the generated image patch and (ii) a fourth difference between the first feature vector and the second feature vector.

A second example embodiment may involve obtaining, e.g., from a memory, an input image patch. The second example embodiment may involve applying an encoder ANN to the input image patch. The encoder ANN may be configured to produce a feature vector from the input image patch. The encoder ANN may have been trained with a first plurality of domain training images such that an output image patch visually resembling the input image patch can be generated from the feature vector. The second example embodiment may involve applying a generator ANN to the feature vector. The generator ANN may be configured to produce a generated image patch from the first feature vector. The generator ANN may have been trained with feature vectors derived from a first plurality of domain training images and a second plurality of generative training images such that the generated image patch visually resembles the input image patch but is constructed of a newly-generated image elements visually resembling one or more image patches from the second plurality of generative training images. The second example embodiment may involve storing, e.g., in the memory, the generated image patch.

In a third example embodiment, a method may be used to perform operations in accordance with the first and/or second example embodiment.

In a fourth example embodiment, an article of manufacture may include a non-transitory computer-readable medium, having stored thereon program instructions that, upon execution by a computing system, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6B depicts a convolution, in accordance with example embodiments.

FIG. 9 is a flow chart, in accordance with example embodiments.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Example Computing Devices and Cloud-Based Computing Environments

The following embodiments describe architectural and operational aspects of example computing devices and systems that may employ the disclosed ANN implementations, as well as the features and advantages thereof.

Figure 1:
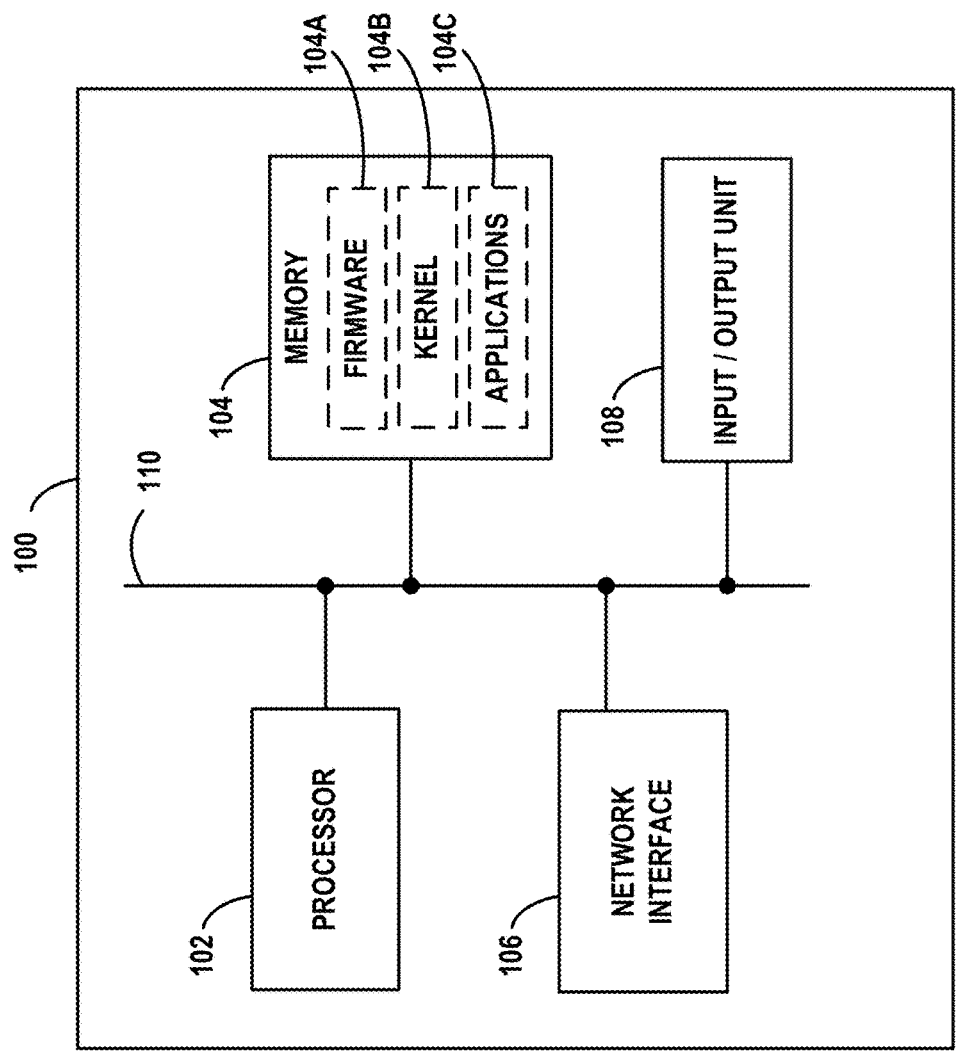
FIG. 1 illustrates a schematic drawing of a computing device, in accordance with example embodiments.

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples. Computing device 100 may include fixed memory as well as one or more removable memory units, the latter including but not limited to various types of secure digital (SD) cards. Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
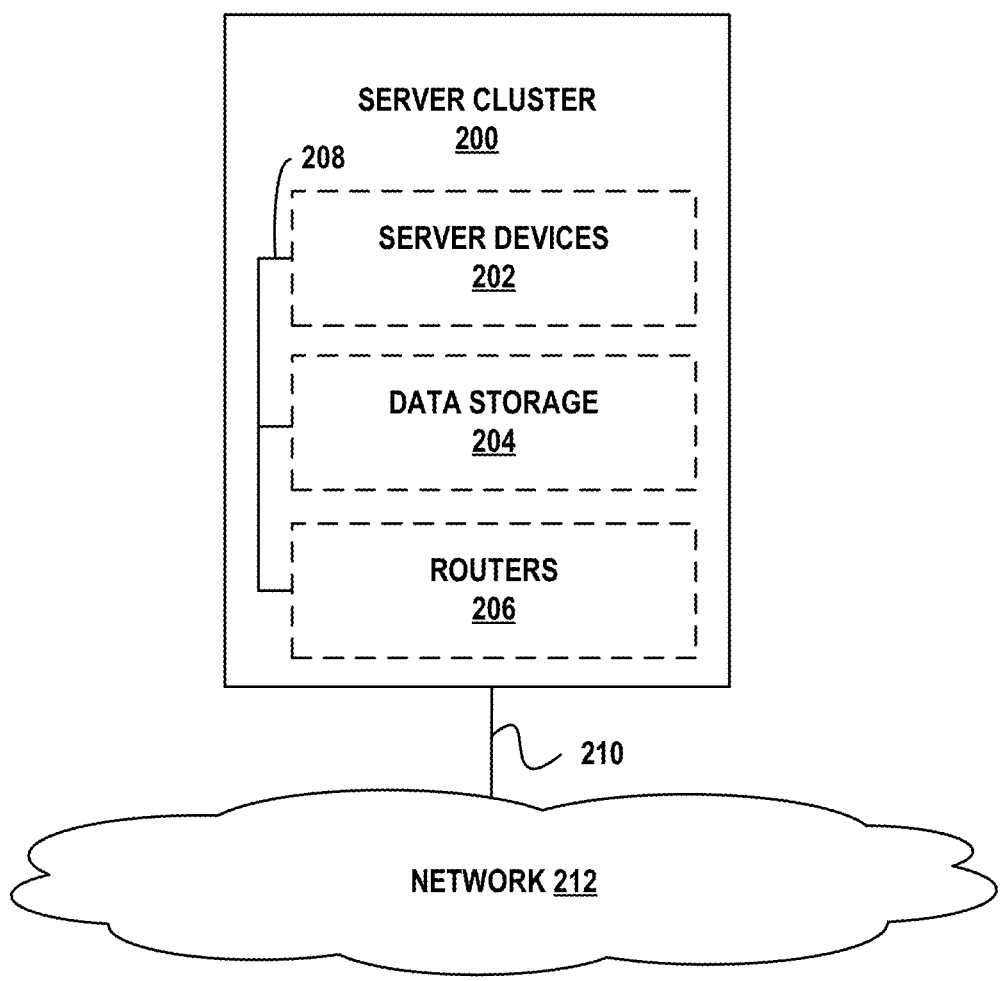
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

II. Generative Mosaics

A generative mosaic encompasses a number of visual effects that can be used to recreate any input image (or video frame) by replacing sampled patches in the input image with automatically generated patches. These replacement patches may be generated according to a pre-determined generative dataset of images, each dataset exhibiting a particular visual theme, such as flowers, galaxies, etc. Particularly, an ANN is trained to generate the patches to mimic the salient characteristics of the generative dataset while simultaneously preserving information in the input image.

Figure 3:
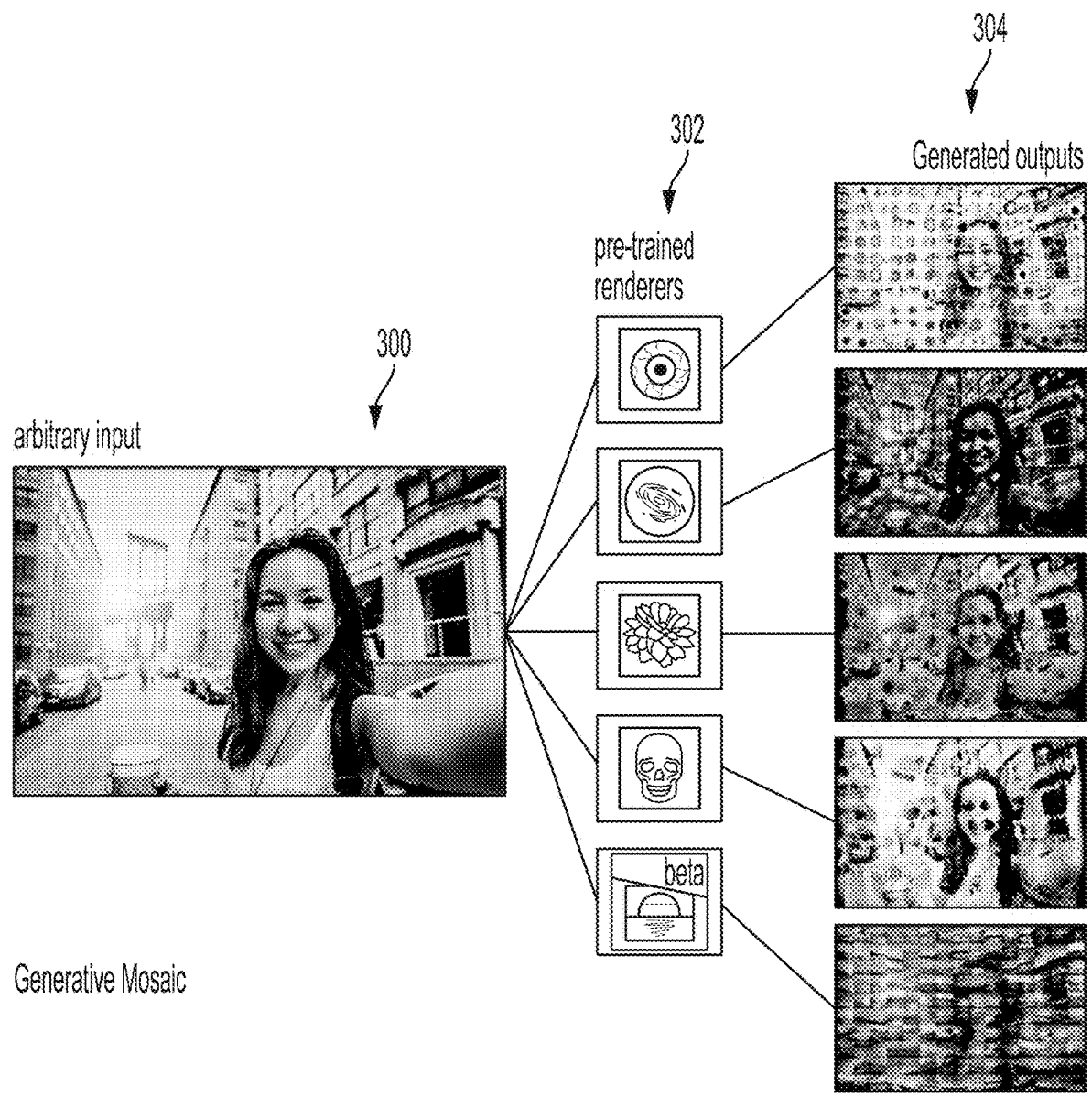
FIG. 3 depicts generative mosaics, in accordance with example embodiments.

An example of this process is shown in FIG. 3. An arbitrary image 300 serves as the input image. Five possible pre-trained generative datasets 302 are available, each selectable by a user or automatically selected. The themes of generative datasets 302 include eyes, galaxies, flowers, skulls, numbers and sunsets. The theme of a generative dataset may be, for example, any class of man-made or natural object, drawing or figures. Other possible themes include, but are not limited to, branded content, churches, cartoon characters, produce, clouds, animals, insects, anime, jewelry, balloons, birds, blurry photos, food, butterflies, cats, cat faces, celebrities, clowns, dogs, drugs, etchings, explosions, first-person footage, fitness, floorplans, furniture, gems, guns, manuscripts, video game content, television and movie content, maps, mechanical content, parties, restaurants, selfies, spaceships, vegetables, vehicles, weapons, and so on.

Output images 304 include patches of input image 300 replaced with replacement patches generated de novo according to each of generative datasets 302. For example, in the fourth one of output images 304 from the top of FIG. 3, the features in input image 300 are replaced by skulls of various sizes and shapes. Notably, these generated skulls do not necessarily exist in the generative dataset depicting a skull. Instead, the generated skulls are created from this generative dataset to fit patches of input image 300.

Generative mosaics are useful for various artistic and entertainment applications, such as image filters for social media, special effects for television, movies, and videos games, and so on. A technical challenge for producing generative mosaics is to do so in real time, or near real time on a device with limiting processing power, such as a mobile phone. In order to address this challenge, a novel combination of ANNs can be used to train a generator that produces the mosaics. Thus, in order to fully appreciate the embodiments herein, a discussion of ANNs can be helpful.

III. Artificial Neural Networks

An ANN is a computational model in which a number of simple units, working individually in parallel and without central control, combine to solve complex problems. While this model may resemble an animal's brain in some respects, analogies between ANNs and brains are tenuous at best. Modern ANNs have a fixed structure, a deterministic mathematical learning process, are trained to solve one problem at a time, and are much smaller than their biological counterparts.

A. Example ANN

Figure 4:
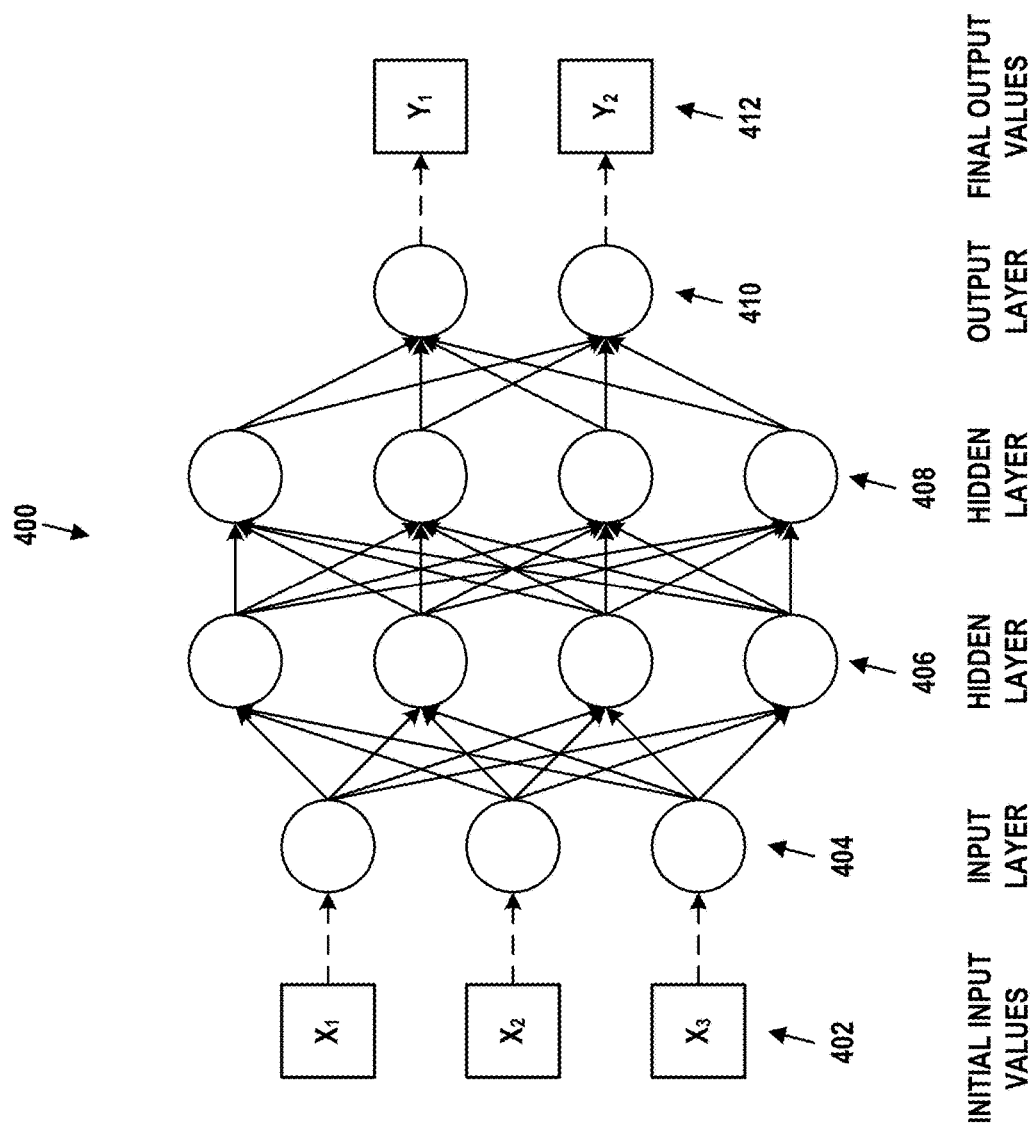
FIG. 4 depict an ANN architecture, in accordance with example embodiments.

An ANN is represented as a number of nodes that are arranged into a number of layers, with connections between the nodes of adjacent layers. An example ANN 400 is shown in FIG. 4. ANN 400 represents a feed-forward multilayer neural network, but similar structures and principles are used in CNNs, recurrent neural networks, and recursive neural networks, for example.

Regardless, ANN 400 consists of four layers: input layer 404, hidden layer 406, hidden layer 408, and output layer 410. The three nodes of input layer 404 respectively receive $X_1$, $X_2$, and $X_3$ from initial input values 402. The two nodes of output layer 410 respectively produce $Y_1$ and $Y_2$ for final output values 412. ANN 400 is a fully-connected network, in that nodes of each layer aside from input layer 404 receive input from all nodes in the previous layer.

The solid arrows between pairs of nodes represent connections through which intermediate values flow, and are each associated with a respective weight that is applied to the respective intermediate value. Each node performs an operation on its input values and their associated weights (e.g., values between 0 and 1, inclusive) to produce an output value. In some cases this operation may involve a dot-product sum of the products of each input value and associated weight. An activation function may be applied to the result of the dot-product sum to produce the output value. Other operations are possible.

For example, if a node receives input values $\{x_1, x_2, \ldots, x_n\}$ on n connections with respective weights of $\{w_1, w_2, \ldots, w_n\}$, the dot-product sum d may be determined as:

$$d = \sum_{i=1}^{n} x_i w_i + b \qquad (1)$$

Where b is a node-specific or layer-specific bias.

Notably, the fully-connected nature of ANN 400 can be used to effectively represent a partially-connected ANN by giving one or more weights a value of 0. Similarly, the bias can also be set to 0 to eliminate the b term.

An activation function, such as the logistic function, may be used to map d to an output value y that is between 0 and 1, inclusive:

$$y = \frac{1}{1 + e^{-d}} \qquad (2)$$

Functions other than the logistic function, such as the sigmoid or tan h functions, may be used instead.

Then, y may be used on each of the node's output connections, and will be modified by the respective weights thereof. Particularly, in ANN 400, input values and weights are applied to the nodes of each layer, from left to right until final output values 412 are produced. If ANN 400 has been fully trained, final output values 412 are a proposed solution to the problem that ANN 400 has been trained to solve. In order to obtain a meaningful, useful, and reasonably accurate solution, ANN 400 requires at least some extent of training.

B. Training

Training an ANN usually involves providing the ANN with some form of supervisory training data, namely sets of input values and desired, or ground truth, output values. For ANN 400, this training data may include m sets of input values paired with output values. More formally, the training data may be represented as:

$$\{X_{1,i}, X_{2,i}, X_{3,i}, \widehat{Y_{1,i}}, \widehat{Y_{2,i}}\} \qquad (3)$$

Where i=1 . . . m, and $\widehat{Y_{1,i}}$ and $\widehat{Y_{2,i}}$ are the desired output values for the input values of $X_{1,i}$, $X_{2,i}$, and $X_{3,i}$.

The training process involves applying the input values from such a set to ANN 400 and producing associated output values. A loss function is used to evaluate the error between the produced output values and the ground truth output values. This loss function may be a sum of differences, mean squared error, or some other metric. In some cases, error values are determined for all of the m sets, and the error function involves calculating an aggregate (e.g., an average) of these values.

Once the error is determined, the weights on the connections are updated in an attempt to reduce the error. In simple terms, this update process should reward "good" weights and penalize "bad" weights. Thus, the updating should distribute the "blame" for the error through ANN 400 in a fashion that results in a lower error for future iterations of the training data.

The training process continues applying the training data to ANN 400 until the weights converge. Convergence occurs when the error is less than a threshold value or the change in the error is sufficiently small between consecutive iterations of training. At this point, ANN 400 is said to be "trained" and can be applied to new sets of input values in order to predict output values that are unknown.

Most training techniques for ANNs make use of some form of backpropagation. Backpropagation distributes the error one layer at a time, from right to left, through ANN 400. Thus, the weights of the connections between hidden layer 408 and output layer 410 are updated first, the weights of the connections between hidden layer 406 and hidden layer 408 are updated second, and so on. This updating is based on the derivative of the activation function.

Figure 5A:
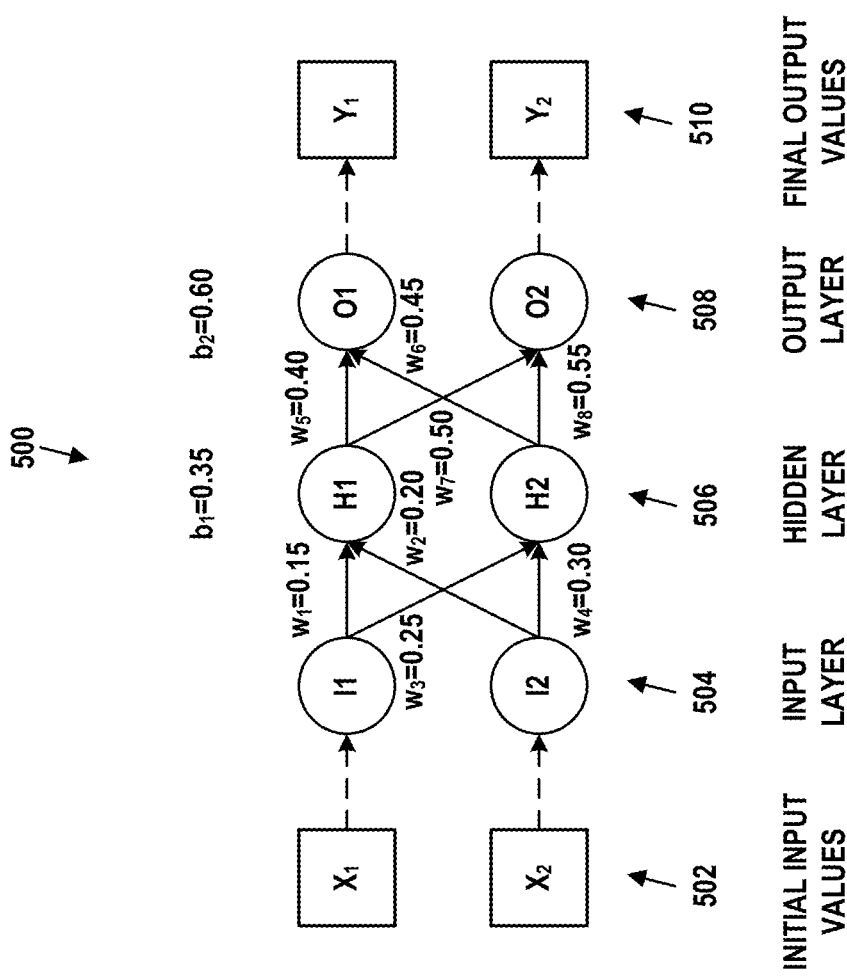
FIGS. 5A and 5B depict training an ANN, in accordance with example embodiments.

In order to further explain error determination and backpropagation, it is helpful to look at an example of the process in action. However, backpropagation becomes quite complex to represent except on the simplest of ANNs. Therefore, FIG. 5A introduces a very simple ANN 500 in order to provide an illustrative example of backpropagation.

TABLE 1

| Weight | Nodes | Weight | Nodes |
|--------|-------|--------|-------|
| $w_1$ | I1, H1 | $w_5$ | H1, O1 |
| $w_2$ | I2, H1 | $w_6$ | H2, O1 |
| $w_3$ | I1, H2 | $w_7$ | H1, O2 |
| $w_4$ | I2, H2 | $w_8$ | H2, O2 |

ANN 500 consists of three layers, input layer 504, hidden layer 506, and output layer 508, each having two nodes. Initial input values 502 are provided to input layer 504, and output layer 508 produces final output values 510. Weights have been assigned to each of the connections. Also, bias $b_1=0.35$ is applied to the net input of each node in hidden layer 506, and a bias $b_2=0.60$ is applied to the net input of each node in output layer 508. For clarity, Table 1 maps weights to pair of nodes with connections to which these weights apply. As an example, $w_2$ is applied to the connection between nodes I2 and H1, $w_7$ is applied to the connection between nodes H1 and O2, and so on.

[61] For purposes of demonstration, initial input values are set to $X_1=0.05$ and $X_2=0.10$, and the desired output values are set to $\hat{Y}_1=0.01$ and $\hat{Y}_2=0.99$. Thus, the goal of training ANN 500 is to update the weights over some number of feed forward and backpropagation iterations until the final output values 510 are sufficiently close to $\hat{Y}_1=0.01$ and $\hat{Y}_2=0.99$ when $X_1=0.05$ and $X_2=0.10$. Note that use of a single set of training data effectively trains ANN 500 for just that set. If multiple sets of training data are used, ANN 500 will be trained in accordance with those sets as well.

1. Example Feed Forward Pass

To initiate the feed forward pass, net inputs to each of the nodes in hidden layer 506 are calculated. From the net inputs, the outputs of these nodes can be found by applying the activation function.

For node H1, the net input $net_{H1}$ is:

$$net_{H1}=w_1X_1+w_2X_2+b_1$$
$$=(0.15)(0.05)+(0.20)(0.10)+0.35=0.3775 \quad (4)$$

Applying the activation function (here, the logistic function) to this input determines that the output of node H1, $out_{H1}$ is:

$$out_{H1} = \frac{1}{1+e^{-net_{H1}}} \quad (5)$$
$$= 0.593269992$$

Following the same procedure for node H2, the output $out_{H2}$ is 0.596884378. The next step in the feed forward iteration is to perform the same calculations for the nodes of output layer 508. For example, net input to node O1, $net_{O1}$ is:

$$net_{O1} = w_5 out_{H1} + w_6 out_{H2} + b_2 \quad (6)$$
$$= (0.40)(0.593269992) + (0.45)(0.596884378) + 0.60$$
$$= 1.105905967$$

Thus, output for node O1, $out_{O1}$ is:

$$out_{O1} = \frac{1}{1+e^{-net_{O1}}} \quad (7)$$
$$= 0.75136507$$

Following the same procedure for node O2, the output $out_{O2}$ is 0.772928465. At this point, the total error, $\Delta$, can be determined based on a loss function. In this case, the loss function can be the sum of the squared error for the nodes in output layer 508. In other words:

$$\Delta = \Delta_{O1} + \Delta_{O2} \quad (8)$$
$$= \frac{1}{2}(out_{O1}-\hat{Y}_1)^2 + \frac{1}{2}(out_{O2}-\hat{Y}_2)^2$$
$$= \frac{1}{2}(0.75136507-0.01)^2 + \frac{1}{2}(0.772928465-0.99)^2$$
$$= 0.274811083 + 0.023560026 = 0.298371109$$

The multiplicative constant ½ in each term is used to simplify differentiation during backpropagation. Since the overall result is scaled by a learning rate anyway, this constant does not negatively impact the training. Regardless, at this point, the feed forward iteration completes and backpropagation begins.

2. Backpropagation

As noted above, a goal of backpropagation is to use $\Delta$ to update the weights so that they contribute less error in future feed forward iterations. As an example, consider the weight $w_5$. The goal involves determining how much the change in $w_5$ affects $\Delta$. This can be expressed as the partial derivative $$\frac{\partial \Delta}{\partial w_5}.$$

Using the chain rule, this term can be expanded as:

$$\frac{\partial \Delta}{\partial w_5} = \frac{\partial \Delta}{\partial out_{O1}} \times \frac{\partial out_{O1}}{\partial net_{O1}} \times \frac{\partial net_{O1}}{\partial w_5} \quad (9)$$

Thus, the effect on $\Delta$ of change to $w_5$ is equivalent to the product of (i) the effect on $\Delta$ of change to $out_{O1}$, (ii) the effect on $out_{O1}$ of change to $net_{O1}$, and (iii) the effect on $net_{O1}$ of change to $w_5$. Each of these multiplicative terms can be determined independently. Intuitively, this process can be thought of as isolating the impact of $w_5$ on $net_{O1}$, the impact of $net_{O1}$ on $out_{O1}$, and the impact of $out_{O1}$ on $\Delta$.

Starting with $$\frac{\partial \Delta}{\partial out_{O1}},$$

the expression for $\Delta$ is:

$$\Delta = \frac{1}{2}(out_{O1}-\hat{Y}_1)^2 + \frac{1}{2}(out_{O2}-\hat{Y}_2)^2 \quad (10)$$

When taking the partial derivative with respect to $out_{O1}$, the term containing $out_{O2}$ is effectively a constant because changes to $out_{O1}$ do not affect this term. Therefore:

$$\frac{\partial \Delta}{\partial out_{O1}} = out_{O1} - \hat{Y}_1 \quad (11)$$
$$= 0.75136507 - 0.01 = 0.74136507$$

For $$\frac{\partial out_{O1}}{\partial net_{O1}},$$

the expression for $out_{O1}$, from Equation 5, is:

$$out_{O1} = \frac{1}{1 + e^{-net_{O1}}} \quad (12)$$

Therefore, taking the derivative of the logistic function:

$$\frac{\partial out_{O1}}{\partial net_{O1}} = out_{O1}(1 - out_{O1}) \quad (13)$$
$$= 0.75136507(1 - 0.75136507) = 0.186815602$$

For $$\frac{\partial net_{O1}}{\partial w_5},$$

the expression for $net_{O1}$, from Equation 6, is:

$$net_{O1} = w_5 out_{H1} + w_6 out_{H2} + b_2 \quad (14)$$

Similar to the expression for $\Delta$, taking the derivative of this expression involves treating the two rightmost terms as constants, since $w_5$ does not appear in those terms. Thus:

$$\frac{\partial net_{O1}}{\partial w_5} = out_{H1} = 0.593269992 \quad (15)$$

These three partial derivative terms can be put together to solve Equation 9:

$$\frac{\partial \Delta}{\partial w_5} = (out_{O1} - \hat{Y}_1) out_{O1}(1 - out_{O1}) out_{H1} \quad (16)$$
$$= (0.74136507)(0.186815602)(0.593269992) =$$
$$0.082167041$$

Then, this value can be subtracted from $w_5$. Often a gain, $0 < \alpha \le 1$, is applied to $$\frac{\partial \Delta}{\partial w_5}$$

to control how aggressively the ANN responds to errors. Assuming that $\alpha = 0.5$, the full expression is:

$$w_5 = w_5 - \alpha \frac{\partial \Delta}{\partial w_5} \quad (17)$$
$$= 0.4 - (0.5)(0.082167041) = 0.35891648$$

This process can be repeated for the other weights feeding into output layer 508. The results are:

$w_6 = 0.408666186$ $w_7 = 0.511301270$ $w_8 = 0.561370121 \quad (18)$

Note that no weights are updated until the updates to all weights have been determined at the end of backpropagation. Then, all weights are updated before the next feed forward iteration.

Next, updates to the remaining weights, $w_1$, $w_2$, $w_3$, and $w_4$ are calculated. This involves continuing the backpropagation pass to hidden layer 506. Considering $w_1$ and using a similar derivation as above:

$$\frac{\partial \Delta}{\partial w_1} = \frac{\partial \Delta}{\partial out_{H1}} \times \frac{\partial out_{H1}}{\partial net_{H1}} \times \frac{\partial net_{H1}}{\partial w_1} \quad (19)$$

One difference, however, between the backpropagation techniques for output layer 508 and hidden layer 506 is that each node in hidden layer 506 contributes to the error of all nodes in output layer 508. Therefore:

$$\frac{\partial \Delta}{\partial out_{H1}} = \frac{\partial \Delta_{O1}}{\partial out_{H1}} + \frac{\partial \Delta_{O2}}{\partial out_{H1}} \quad (20)$$

Beginning with $$\frac{\partial \Delta_{O1}}{\partial out_{H1}}:$$

$$\frac{\partial \Delta_{O1}}{\partial out_{H1}} = \frac{\partial \Delta_{O1}}{\partial net_{O1}} \times \frac{\partial net_{O1}}{\partial out_{H1}} \quad (21)$$

Regarding $$\frac{\partial \Delta_{O1}}{\partial net_{O1}},$$

the impact of change in $net_{O1}$ on $\Delta_{O1}$ is the same as impact of change in $net_{O1}$ on $\Delta$, so the calculations performed above for Equations 11 and 13 can be reused:

$$\frac{\partial \Delta_{O1}}{\partial net_{O1}} = \frac{\partial \Delta}{\partial out_{O1}} \times \frac{\partial out_{O1}}{\partial net_{O1}} \quad (22)$$
$$= (0.74136507)(0.186815602)$$
$$= 0.138498562$$

Regarding $$\frac{\partial net_{O1}}{\partial out_{H1}},$$

$net_{O1}$ can be expressed as:

$$net_{O1} = w_5 out_{H1} + w_6 out_{H2} + b_2 \quad (23)$$

Thus:

$$\frac{\partial net_{O1}}{\partial out_{H1}} = w_5 = 0.40 \quad (24)$$

Therefore, Equation 21 can be solved as:

$$\frac{\partial \Delta_{O1}}{\partial out_{H1}} = \frac{\partial \Delta_{O1}}{\partial net_{O1}} \times \frac{\partial net_{O1}}{\partial out_{H1}} \quad (25)$$
$$= (0.138498562)(0.40)$$
$$= 0.055399425$$

Following a similar procedure for $$\frac{\partial \Delta_{O2}}{\partial out_{H1}}$$

results in:

$$\frac{\partial \Delta_{O2}}{\partial out_{H1}} = -0.019049119 \quad (26)$$

Consequently, Equation 20 can be solved as:

$$\frac{\partial \Delta}{\partial out_{H1}} = \frac{\partial \Delta_{O1}}{\partial out_{H1}} + \frac{\partial \Delta_{O2}}{\partial out_{H1}} \quad (27)$$
$$= 0.055399425 - 0.019049119$$
$$= 0.036350306$$

This also solves for the first term of Equation 19. Next, since node H1 uses the logistic function as its activation function to relate $out_{H1}$ and $net_{H1}$, the second term of Equation 19, $$\frac{\partial out_{H1}}{\partial net_{H1}},$$

can be determined as:

$$\frac{\partial out_{H1}}{\partial net_{H1}} = out_{H1}(1 - out_{H1}) \quad (28)$$
$$= 0.59326999(1 - 0.59326999)$$
$$= 0.241300709$$

Then, as $net_{H1}$ can be expressed as:

$$net_{H1} = w_1 X_1 + w_2 X_2 + b_1 \quad (29)$$

Thus, the third term of Equation 19 is:

$$\frac{\partial net_{H1}}{\partial w_1} = X_1 = 0.05 \quad (30)$$

Putting the three terms of Equation 19 together, the result is:

$$\frac{\partial \Delta}{\partial w_1} = \frac{\partial \Delta}{\partial out_{H1}} \times \frac{\partial out_{H1}}{\partial net_{H1}} \times \frac{\partial net_{H1}}{\partial w_1} \quad (31)$$
$$= (0.036350306)(0.241300709)(0.05)$$
$$= 0.000438568$$

With this, $w_1$ can be updated as:

$$w_1 = w_1 - \alpha \frac{\partial \Delta}{\partial w_1} \quad (32)$$
$$= 0.15 - (0.5)(0.000438568)$$
$$= 0.149780716$$

This process can be repeated for the other weights feeding into hidden layer 506. The results are:

$$w_2 = 0.19956143$$
$$w_3 = 0.24975114$$
$$w_4 = 0.29950229 \quad (33)$$

Figure 5B:
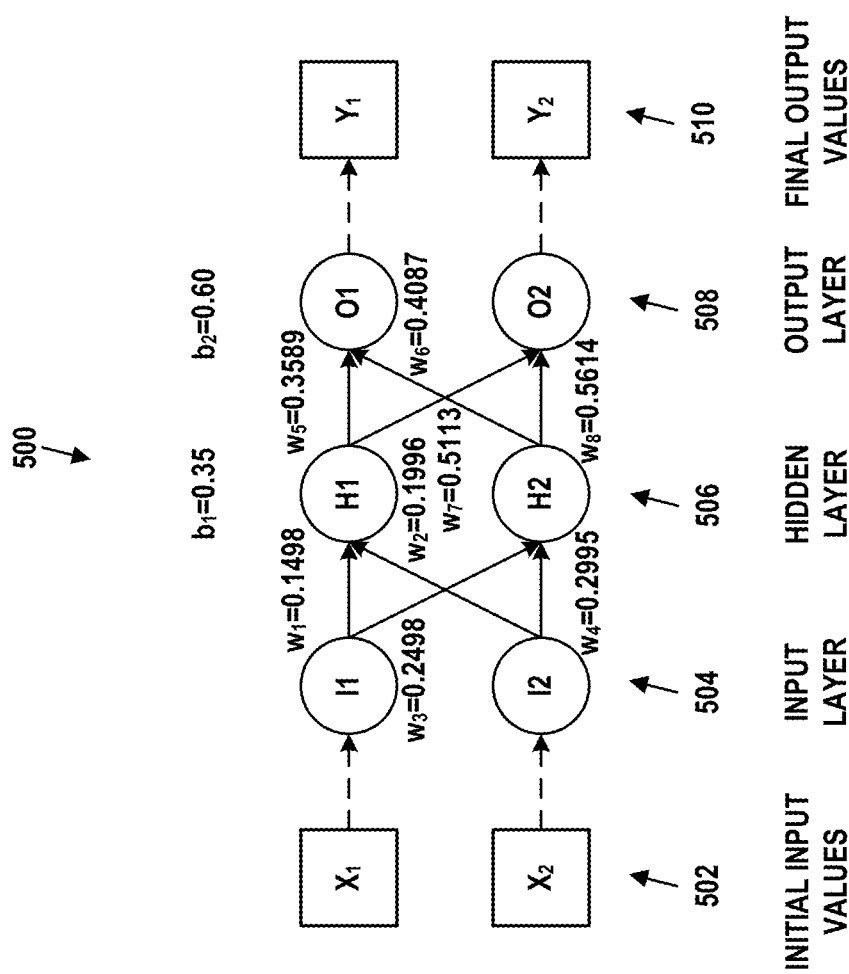

At this point, the backpropagation iteration is over, and all weights have been updated. FIG. 5B shows ANN 500 with these updated weights, values of which are rounded to four decimal places for sake of convenience. ANN 500 may continue to be trained through subsequent feed forward and backpropagation iterations. For instance, the iteration carried out above reduces the total error, $\Delta$, from 0.298371109 to 0.291027924. While this may seem like a small improvement, over several thousand feed forward and backpropagation iterations the error can be reduced to less than 0.0001. At that point, the values of $Y_1$ and $Y_2$ will be close to the target values of 0.01 and 0.99, respectively.

In some cases, an equivalent amount of training can be accomplished with fewer iterations if the hyperparameters of the system (e.g., the biases $b_1$ and $b_2$ and the learning rate $\alpha$) are adjusted. For instance, the setting the learning rate closer to 1.0 may result in the error rate being reduced more rapidly. Additionally, the biases can be updated as part of the learning process in a similar fashion to how the weights are updated.

Regardless, ANN 500 is just a simplified example. Arbitrarily complex ANNs can be developed with the number of nodes in each of the input and output layers tuned to address specific problems or goals. Further, more than one hidden layer can be used and any number of nodes can be in each hidden layer.

C. Convolutional Neural Networks

CNNs are similar to ANNs, in that they consist of some number of layers of nodes, with weighted connections therebetween and possible per-layer biases. The weights and biases may be updated by way of feed forward and backpropagation procedures discussed above. A loss function may be used to compare output values of feed forward processing to desired output values.

On the other hand, CNNs are usually designed with the explicit assumption that the initial input values are derived from one or more images. In some embodiments, each color channel of each pixel in an image patch is a separate initial input value. Assuming three color channels per pixel (e.g., red, green, and blue), even a small 32×32 patch of pixels will result in 3072 incoming weights for each node in the first hidden layer. Clearly, using a naïve ANN for image processing could lead to a very large and complex model that would take long to train.

Instead, CNNs are designed to take advantage of the inherent structure that is found in almost all images. In particular, nodes in a CNN are only connected to a small number of nodes in the previous layer. This CNN architecture can be thought of as three dimensional, with nodes arranged in a block with a width, a height, and a depth. For example, the aforementioned 32×32 patch of pixels with 3 color channels may be arranged into an input layer with a width of 32 nodes, a height of 32 nodes, and a depth of 3 nodes.

Figure 6A:
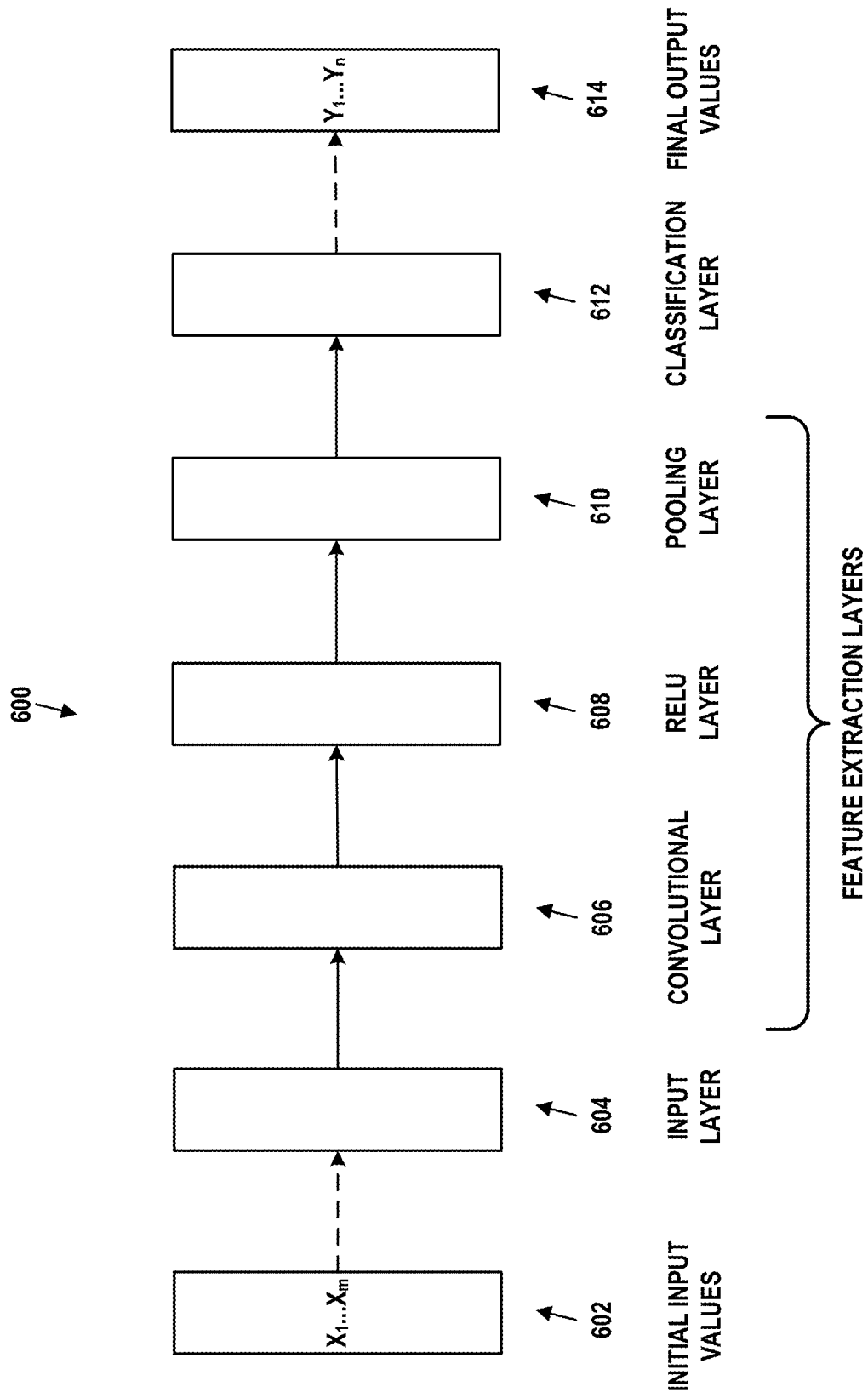
FIG. 6A depicts a CNN architecture, in accordance with example embodiments.

An example CNN 600 is shown in FIG. 6A. Initial input values 602, represented as pixels $X_1 \ldots X_m$, are provided to input layer 604. As discussed above, input layer 604 may have three dimensions based on the width, height, and number of color channels of pixels $X_1 \ldots X_m$. Input layer 604 provides values into one or more sets of feature extraction layers, each set containing an instance of convolutional layer 606, RELU layer 608, and pooling layer 610. The output of pooling layer 610 is provided to one or more classification layers 612. Final output values 614 may be arranged in a feature vector representing a concise characterization of initial input values 602.

Convolutional layer 606 may transform its input values by sliding one or more filters around the three-dimensional spatial arrangement of these input values. A filter is represented by biases applied to the nodes and the weights of the connections therebetween, and generally has a width and height less than that of the input values. The result for each filter may be a two-dimensional block of output values (referred to as an feature map) in which the width and height can have the same size as those of the input values, or one or more of these dimensions may have different size. The combination of each filter's output results in layers of feature maps in the depth dimension, in which each layer represents the output of one of the filters.

Applying the filter may involve calculating the dot-product sum between the entries in the filter and a two-dimensional depth slice of the input values. An example of this is shown in FIG. 6B. Matrix 620 represents input to a convolutional layer, and thus could be image data, for example. The convolution operation overlays filter 622 on matrix 620 to determine output 624. For instance, when filter 622 is positioned in the top left corner of matrix 620, and the dot-product sum for each entry is calculated, the result is 4. This is placed in the top left corner of output 624.

Turning back to FIG. 6A, a CNN learns filters during training such that these filters can eventually identify certain types of features at particular locations in the input values. As an example, convolutional layer 606 may include a filter that is eventually capable of detecting edges and/or colors in the image patch from which initial input values 602 were derived. A hyperparameter called receptive field determines the number of connections between each node in convolutional layer 606 and input layer 604. This allows each node to focus on a subset of the input values.

RELU layer 608 applies an activation function to output provided by convolutional layer 606. In practice, it has been determined that the rectified linear unit (RELU) function, or a variation thereof, appears to provide the best results in CNNs. The RELU function is a simple thresholding function defined as $f(x)=\max(0, x)$. Thus, the output is 0 when x is negative, and x when x is non-negative. A smoothed, differentiable approximation to the RELU function is the softplus function. It is defined as $f(x)=\log(1+e^x)$. Nonetheless, other functions may be used in this layer.

Pooling layer 610 reduces the spatial size of the data by downsampling each two-dimensional depth slice of output from RELU layer 608. One possible approach is to apply a 2×2 filter with a stride of 2 to each 2×2 block of the depth slices. This will reduce the width and height of each depth slice by a factor of 2, thus reducing the overall size of the data by 75%.

Classification layer 612 computes final output values 614 in the form of a feature vector. As an example, in a CNN trained to be an image classifier, each entry in the feature vector may encode a probability that the image patch contains a particular class of item (e.g., a human face, a cat, a beach, a tree, etc.).

In some embodiments, there are multiple sets of the feature extraction layers. Thus, an instance of pooling layer 610 may provide output to an instance of convolutional layer 606. Further, there may be multiple instances of convolutional layer 606 and RELU layer 608 for each instance of pooling layer 610.

CNN 600 represents a general structure that can be used in image processing. Convolutional layer 606 and classification layer 612 apply weights and biases similarly to layers in ANN 500, and these weights and biases may be updated during backpropagation so that CNN 600 can learn. On the other hand, RELU layer 608 and pooling layer 610 generally apply fixed operations and thus might not learn.

Not unlike an ANN, a CNN can include a different number of layers than is shown in the examples herein, and each of these layers may include a different number of nodes. Thus, CNN 600 is merely for illustrative purposes and should not be considered to limit the structure of a CNN.

IV. Example Generative Adversarial Network

Figure 7:
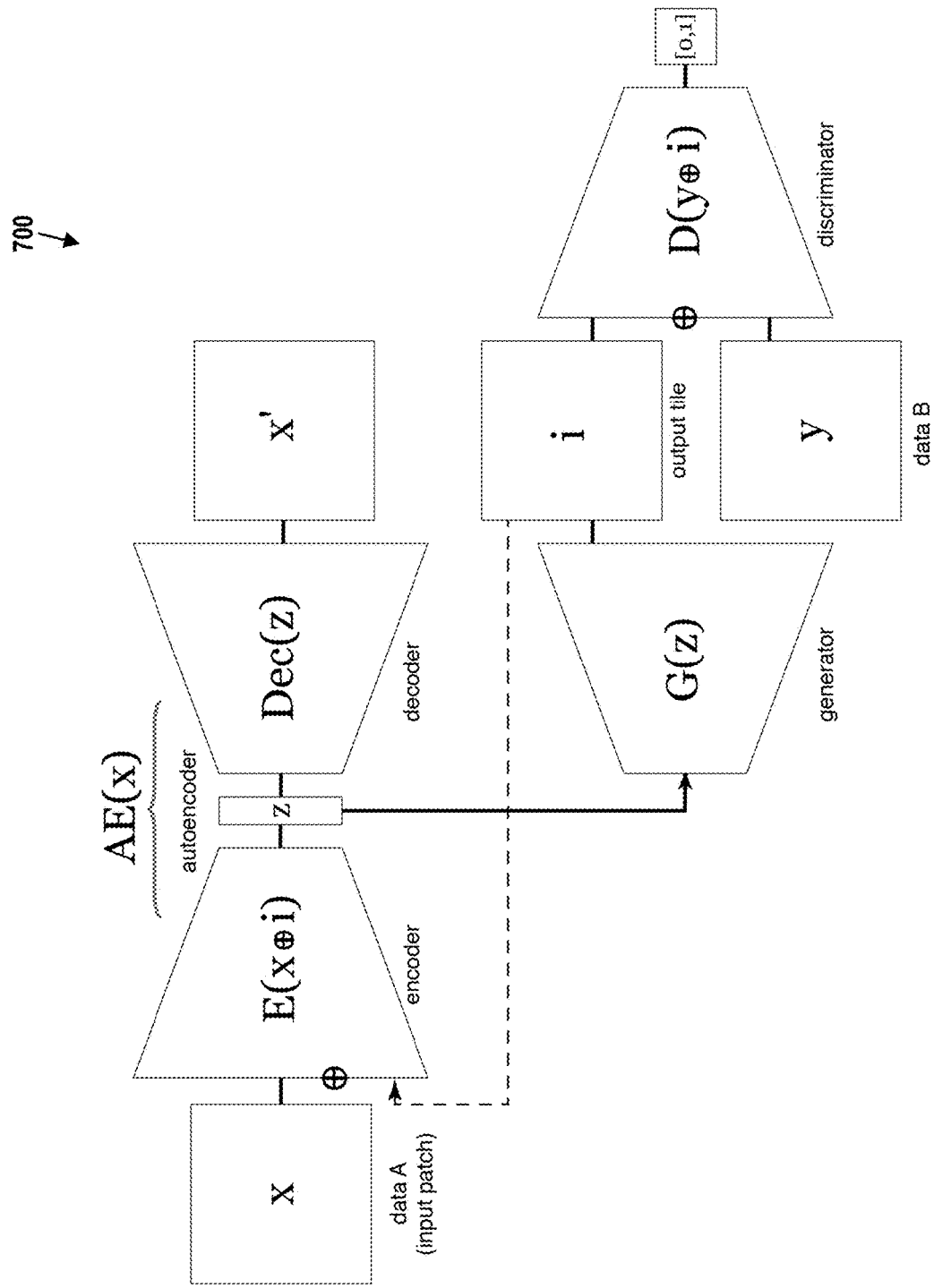
FIG. 7 depicts training a hybrid autoencoder and generative adversarial network, in accordance with example embodiments.

The generative mosaic embodiments described herein may use a new type of generative adversarial network (GAN) to train an encoder and a generator to produce image patches that resemble the structure of an input image patch but are composed of synthetic, generative elements that mimic those of a particular theme. This new GAN may be referred to as yGAN 700, and is shown in FIG. 7.

The generative mosaic process has two stages. First, a pair of CNNs are trained to transform input image patches from dataset A (typically natural images such as one might expect users to photograph or film) into output patches that resemble dataset B (typically a stylistically interesting theme, such as flowers, or astronomical phenomena). Second, after the model has been trained, elements of it are used to render and reconstruct full images and video.

To give a concrete example, consider two datasets: dataset A (randomly cropped patches from 200,000 images of faces), and dataset B (8000 pictures of individual flowers). The CNNs are trained with loss functions such that when provided any cropped face patch, say a crop of the nose, it will attempt to recreate that patch while simultaneously making it a plausible patch from the flower dataset. This ideally yields a configuration of flower petals that follow the contours of the nose.

Because this model attempts to generate plausible patches, rather than entire images directly, adjusting the parameters of the CNNs to achieve the goal is easier. Global consistency is implicitly maintained by the underlying image that the CNNs are recreating the patches of, and by attempting to recreate small patches the generated patches have more flexibility to match the salient attributes of the target dataset (dataset B).

The behaviors of the datasets that can be used in the present invention are a measure of their set complexity and variety. Because the current primary application is unconstrained on the input side, a broad Flickr-based dataset (MIRFLICKR-1M) is used as a proxy for all images. In practice, this gives good results for arbitrary input. For specific, custom uses with known content and relaxed time constraints, more exact input datasets can be selected (i.e., if the application uses specific drone footage, one would train with that exact footage). The choice of destination dataset (flowers, galaxies, insects, etc.) depends on the application and is essentially limitless. Alternately, dataset A can be a transformation of dataset B with a number of immediate image processing applications.

Notably, source patches can be selected arbitrarily, in any number, position, scale, or rotation. Additionally, any sequence of patch transformations can be applied to an image or image sequence. That is, patches may animate freely in time over still or moving images.

A. Model Definition

With reference to FIG. 7, let $x \sim \mathcal{F}_A$ denote a patch sampled from dataset A, and $y \sim \mathcal{F}_B$ denote a patch sampled from dataset B. E is a function, parameterized by a CNN, which takes in a patch and transforms it into a latent code z (e.g., a feature vector). This latent code z can be thought of as a compressed representation of the input to E. Latent code z is then used as the input to the functions Dec and G.

Dec is another CNN that serves as a decoder which attempts to invert E and reproduce the input of E from z. Collectively, E and Dec are an autoencoder that is trained to be able to produce x' from x, where x' is intended to be a close approximation of x. The loss function for this autoencoder is:

$$\ell_{auto}(x) = \|x - Dec(E(x))\|_2 \qquad (34)$$
$$= \|x - x'\|_2$$

Thus, a goal is to train E and Dec so that $\ell_{auto}(x)$ is minimized, or at least below a reasonably small threshold value.

G is a generator which attempts to synthesize a patch G(z)=i that mimics patches from dataset B, while maintaining fidelity to x. D is a discriminator that attempts to differentiate between synthesized patches i and real patches y from dataset B, assigning a value of 0 to former, and 1 to the latter. The fidelity of i to x is defined as $\|z-E(i)\|_2$, and the ability to mimic dataset B as $-D(i)$. This yields the loss function:

$$\ell_G(i) = -D(i) + \|z - E(i)\|_2 \qquad (35)$$

Therefore, another goal is to train E and G so that $\ell_G(i)$ is minimized, or at least below a further reasonably small threshold value.

To find parameters of D that differentiate between synthesized patches i, and real patches y from dataset B, the following loss function can be used:

$$\ell_D(y,i) = D(i) - D(y) \qquad (36)$$

Therefore, yet another goal is to train D so that $\ell_D(y, i)$ is minimized, or at least below an additional reasonably small threshold value. By training these four CNNs in accordance with the three loss functions above, yGAN 700 will seek parameters which allow it to efficiently compress patch x into z, transform z into an output patch i that is visually indistinguishable (or nearly indistinguishable) from a real patch from dataset B, and that maintains the structural elements of x by encouraging that $E(i) \approx z = E(x)$.

In addition to these loss functions, other loss functions can be used to direct yGAN to perform in a desired fashion. For example, in addition to the above loss functions, a bounding box loss function, a face marker loss function, and a classification confidence loss function may be employed. During training, an additional classification network (e.g., face recognition or segmentation) compares input and output images and calculates these additional losses.

As a practical example of these additional loss functions, suppose that the goal is to transform arbitrary input faces into some class of output faces (e.g. clowns, zombies, a celebrity). During training, all yGAN operations are the same, however an additional evaluation is performed after each step. Both the input patch (a real face) and the output patch (the generator's current attempt at a clown face, zombie face, celebrity face, etc.) are evaluated by a face recognition system. This system returns a bounding box, a set of face markers, and a confidence score for both "faces." These scores, in turn, are used as losses (L1 or L2) for the generator. A segmentation network can be used in the same way to derive loss from how the input and output images are classified at the pixel level.

B. Training

Training the CNNs to achieve this task currently takes on the order of hours to weeks and, once completed, creates model weights that can be reused ad infinitum by the generative process. The training involves iterating over the following procedure.

First, a random patch x of arbitrary size and position is chosen from dataset A.

Second, the encoder CNN E processes the patch x and encodes a latent embedding z=E(x). This resulting feature vector is then used in two pathways (this branching gives yGAN the "y" in its name).

For branch 1, z is passed to the decoder Dec and it reconstructs the image patch as closely as it can, producing x'=Dec(z). The values of x and x' are used to compute $\ell_{auto}(x)$.

For branch 2, z is also passed to a generator network G, which decodes z into an RGB image output patch i=G(z). The discriminator network D either receives generated patch i or a random cropped patch y from dataset B. D makes a prediction as to whether its input truly came from dataset B. This prediction will either take on a value of 0 (the input is not in dataset B) or 1 (the input is in dataset B), and is used to compute $\ell_D(y, i)$ and the first term of $\ell_G(i)$.

Third, the generated image patch i is also passed back to the encoder CNN E. The resulting feature vector E(i) is compared to z, constituting the second half of term of $\ell_G(i)$.

The gradients of all function parameters are computed with respect to their corresponding loss functions, and updated using a variant of gradient descent. Various activation functions may be utilized, for instance an algorithm for first-order gradient-based optimization of stochastic objective functions, based on adaptive estimates of lower-order moments.

This training procedure has a number of unconventional aspects. By combining an autoencoder and a GAN, a unique CNN-based architecture has been created. This architecture is capable of mapping a source image domain (dataset A) into a destination style (dataset B) while retaining important visual features from the source domain. Typically, GAN architectures use a latent z-vector sampled from the normal distribution as a prior for the generator, G. In the embodiments herein, the bottleneck from a newly introduced autoencoder is a latent z prior in order to model a separate distribution. Rather than being random sample, this z is a reasonable approximation of an input image while being well-formed for generator architecture. Additionally, three specific loss functions are calculated during training. Notably, $\ell_G(i)$ is a new loss based on E's ability to reconstruct z from E(i). This is summed with a weighted inverse-D loss to combine the generation and reconstruction tasks.

Furthermore, the embodiments herein can work with any number of GAN sub-architectures. For instance, instead of the generator/discriminator sub-architecture variant shown herein, a stacked/progressively-growing training method can be used. This allows higher image quality at higher resolutions. Other variants can be plugged into this general architecture.

C. Rendering

After training is complete, the rendering process takes a provided video or image, samples patches from it, recreates those patches using the elements of the above pre-trained model weights, and assembles these generated patches in the same or similar configuration as the originals, yielding a generative mosaic.

Figure 8:
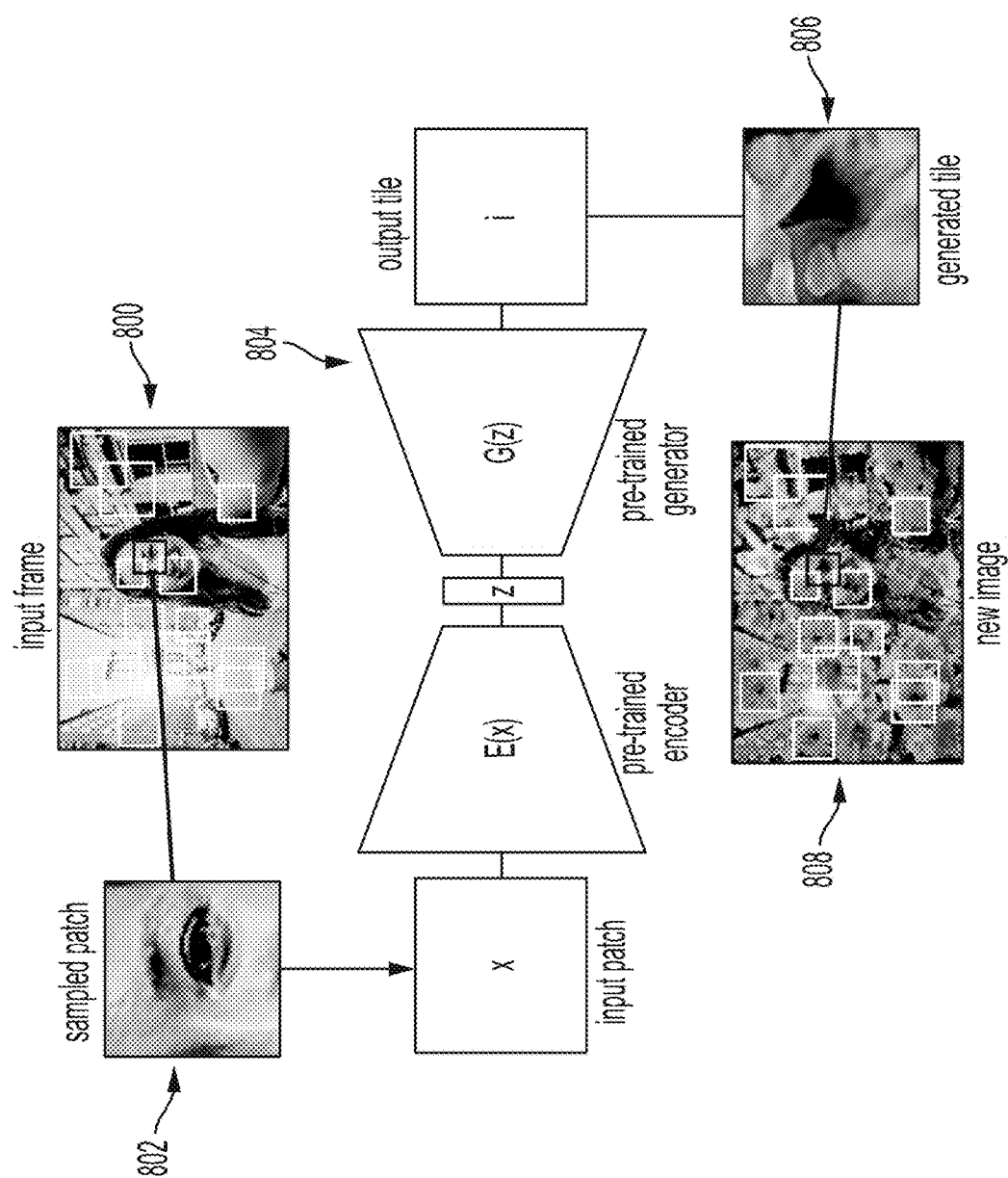
FIG. 8 depicts elements from a trained hybrid autoencoder and generative adversarial network in operation, in accordance with example embodiments.

This procedure is illustrated in the example of FIG. 8. A front-facing video is provided. The generative mosaic software converts sample patches (e.g., patch 802) from one or more of the video's frames (e.g., frame 800). This sampling might or might not be in sequence of the frames. The pre-trained E and G CNNs 804 are used to convert those patches to new patches (e.g., patch 806) and reassemble them to match the input and produce a new frame (e.g., frame 808), or a new video from the frames (i.e., single image operations are treated like one frame in a video). The rendering pipeline allows many options for both aesthetic and performance control. In detail, the process may include the following steps.

Ingest and convert input: Video is simply a sequential collection of individual image frames. Input video is sampled at a frame rate appropriate to the application, saving to disk and/or holding frames in memory. Native frame rate is an ideal capture rate, but in real-time applications a lower frame rate offers computational savings. Similarly, individual frame pixel dimension can be changed to suite performance and visual requirements. Input may be downsampled for additional computational savings, remain native for resolution accuracy, or even upsampled for aesthetic effect.

Sample patches per frame: Each captured frame is then converted into a set of patches. Options for selection of patches are broad and varied based on aesthetic and performance requirements. One may sample a non-overlapping grid of patches or select many overlapping patches. Patches may be uniform in size and shape or may have random size and aspect ratio. Patch sets can remain uniform frame-to-frame or they may change. Ultimately, patch sets are generated as coordinates according to application-specific needs or user desire, and are used to disassemble input frames. These coordinates are stored in memory.

Inference per frame: After an input frame is sampled into constituent patches, it is passed through the pre-trained E and G CNN architecture described above. Pre-training provides for the choice of dataset B (i.e. flowers or galaxies, etc.) and is selected by preference. This architecture replicates a subunit of yGANs training architecture. Each sampled patch is passed to the pre-trained E model, creating a new z vector, which is in turn passed to the G model to generate a new output patch. The new patch is likely to, based on specific training, look like a member of dataset B on which the model was trained while retaining characteristics of the source patch. This proceeds for each sampled patch from each sampled frame.

Reassembly: After the sampled input patches are processed by the CNN architecture, the resulting patch sets are reassembled using the stored patch set coordinates. Various ordering and masking techniques are used to blend (paste) the stack of patches. Each patch has a mask and paste order determined by aesthetic and performance requirements. Once each patch set is assembled per frame, the frames are compiled into the new video.

The embodiments herein sample patches during both training and inference to generate new output patches to be reassembled for new content. The essence of the entire process boils down to two insights: (1) that one could combine an autoencoder with a GAN to perform cross-domain transformations, and (2) that both training and inference with yGAN on patches is possible and would provide innovative capacities. The rendering pipeline is custom-built for this task. Each step in the rendering process was created specifically to confirm the hypothesis of generative mosaic. Furthermore, the relationship between dataset A and dataset B need not be only content driven. This exact process can be applied to image transformations of dataset B to dataset A for use in image processing applications. As an example, dataset A could be a grayscale version of a full color dataset B for colorization applications. Table 2 includes four examples using MIRFLICKR-1M dataset patches in dataset B for general applications.

TABLE 2

| Application | Dataset A |
| --- | --- |
| Colorization | Greyscale versions of the images in dataset B |
| De-noising | Noisy versions of the images in dataset B |
| Super-resolution | Downsampled versions of images in dataset B |
| De-blurring | Blurred versions of the images in dataset B |

Other beneficial aspects of the embodiments herein include that the process is generative. Though the patches generated by the rendering process are derived from both the source and destination datasets, they are new images, and do not represent exact samples from either set. This process generates imagery that simply could not be created otherwise, allowing for flexibility and variety. Additionally, the embodiments allow for significant freedom in mosaic patch size, shape, and position. Patches can be of arbitrary size and position with only qualitative and performance constraints. Masking techniques are used to blend patches (in some modes) and the masking allows for arbitrarily shaped (non-rectangular) patches. The size variety allows one to explore reconstruction resolution from very small patches to single patch full frame reconstruction. Furthermore, the feed forward rendering procedure is fast, especially when compared to many style transfer and deep image manipulation methods. Real-time rendering is well within the capacity of expert engineering.

V. Example Operations

Figure 10:
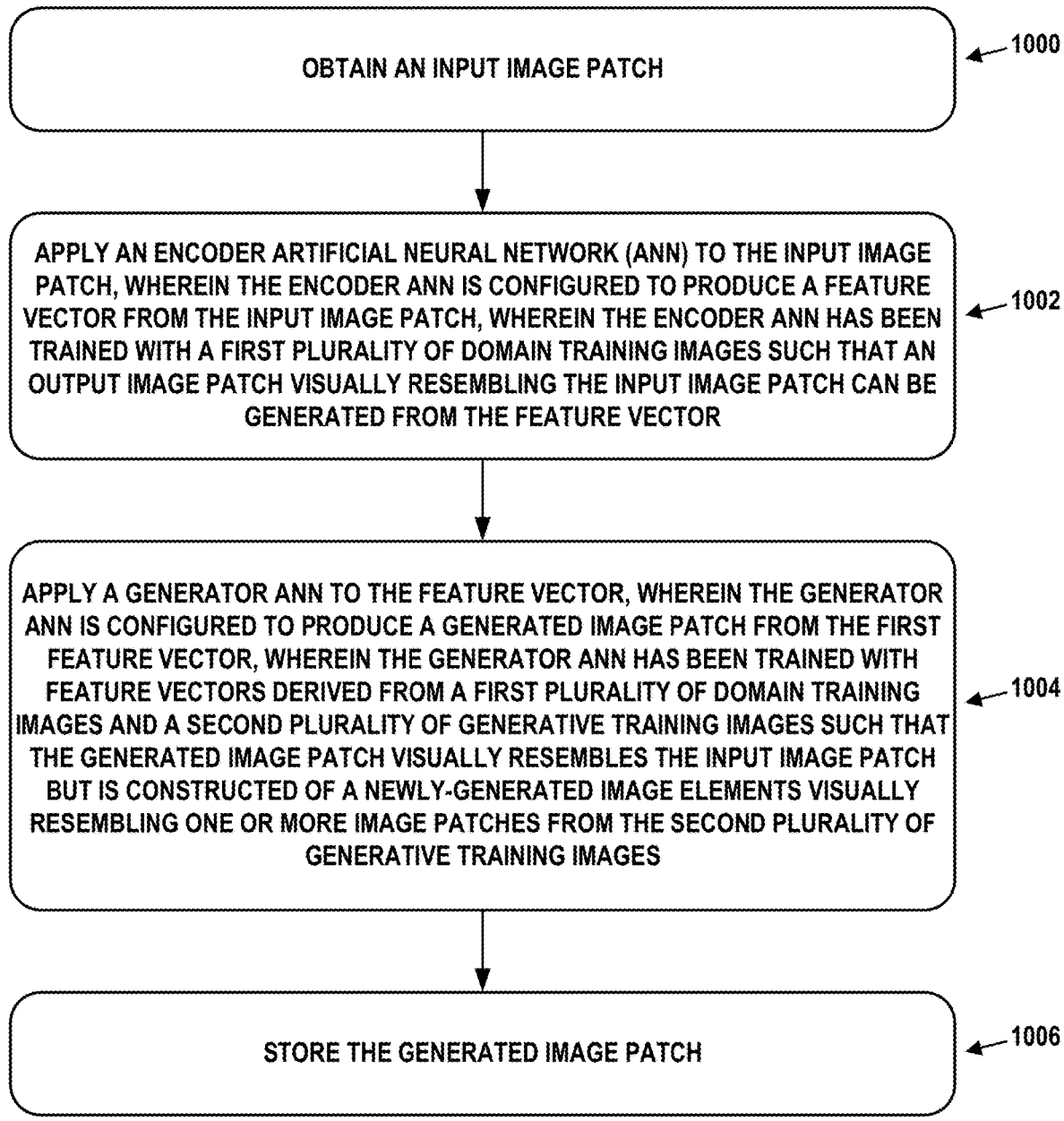
FIG. 10 is a flow chart, in accordance with example embodiments.

FIGS. 9 and 10 are flow charts illustrating example embodiments. The processes illustrated by FIGS. 9 and 10 may be carried out by a computing device, such as computing device 100, and/or a cluster of computing devices, such as server cluster 200. However, the processes can be carried out by other types of devices or device subsystems. For example, the processes could be carried out by a portable computer, such as a laptop or a tablet device.

The embodiments of FIGS. 9 and 10 may be simplified by the removal of any one or more of the features shown therein. Further, these embodiments may be combined with features, aspects, and/or implementations of any of the previous figures or otherwise described herein.

Throughout discussion of FIGS. 9 and 10, an ANN therein may be implemented as a CNN. Also, the term "domain training image" may refer to an image of dataset A, and the term "generative training image" may refer to an image of dataset B.

Block 900 of FIG. 9 may involve training an autoencoder with a first plurality of domain training images. The autoencoder may include: an encoder ANN configured to receive an input image patch from an image of the first plurality of domain training images and produce a first feature vector therefrom, and a decoder ANN configured to receive the first feature vector and produce an output image patch therefrom. The autoencoder training may be based on a first loss function that calculates a first difference between the input image patch and the output image patch.

Block 902 may involve training a discriminator ANN of a GAN. The GAN may include a generator ANN configured to receive the first feature vector and produce a generated image patch from the first feature vector, and the discriminator ANN. The discriminator ANN may be configured to receive the generated image patch and a particular generative training image of a second plurality of generative training images, and provide classifications thereof predicting whether the generated image patch belongs to the second plurality of generative training images. The discriminator ANN training may be based on a second loss function that calculates a second difference between the classification of the generated image patch and the classification of the particular generative training image.

Block 904 may involve training the generator ANN. The encoder ANN may also be configured to receive the generated image patch and produce a second feature vector therefrom. The generator ANN training may be based on a third loss function that calculates a third difference between (i) the classification of the generated image patch and (ii) a fourth difference between the first feature vector and the second feature vector.

In some embodiments, visual content of each of the second plurality of generative training images adhere to a common theme. The common theme may be one of flowers, eyes, stars, galaxies, skulls, numbers, cartoons, or sunsets, for example. In some embodiments, each of the first plurality of domain training images contains a representation of a human face. In some embodiments, the first plurality of domain training images consists of photorealistic images. In some embodiments, the feature vector has between 16 and 2048 elements.

In some embodiments, the input image patch is one of a set of input image patches cropped from an image such that the set of input image patches can be combined to form 80% or more of the image. Alternatively, only particularly salient areas of the output are generated, which might be less than 80%. For instance, only faces in a family portrait may be reconstructed in accordance with the embodiments herein, leaving the rest of the portrait untouched.

In some embodiments, size and location within the image of the input image patch is automatically selected, though user-based selection may be used in addition to or instead of automatic selection. Automatic selection may involve random selection of patches, or selection based on some determination of one or more areas of interest within the image. In some embodiments, the input image patch is from a frame of a multi-frame video. This may result in an animation effect in which a generative patch appears to move across at least part of the mosaic video.

It may be possible to generate a mosaic image using two or more generator ANNs trained with different sets of generative training images (e.g., dataset B1 and database B2). For instance, one generator ANN may be trained with images of galaxies and another generator ANN may be trained with images of skulls. These different ANNs may be applied to different input image patches from the image. Thus, the generated image patch may be based on more than one theme. It may also be possible to provide the output of a generator ANN back through the same or a different generator ANN.

Some embodiments may further involve deploying the trained encoder ANN and the trained generator ANN in tandem as an interactive image filter.

Block 1000 of FIG. 10 may involve obtaining, e.g., from a memory, an input image patch. Block 1002 may involve applying an encoder ANN to the input image patch. The encoder ANN may be configured to produce a feature vector from the input image patch. The encoder ANN may have been trained with a first plurality of domain training images such that an output image patch visually resembling the input image patch can be generated from the feature vector.

Block 1004 may involve applying a generator ANN to the feature vector. The generator ANN may be configured to produce a generated image patch from the first feature vector. The generator ANN may have been trained with feature vectors derived from a first plurality of domain training images and a second plurality of generative training images such that the generated image patch visually resembles the input image patch but is constructed of a newly-generated image elements visually resembling one or more image patches from the second plurality of generative training images. Block 1006 may involve storing, e.g., in the memory, the generated image patch.

In some embodiments, visual content of each of the second plurality of generative training images adhere to a common theme. The common theme may be one of flowers, eyes, stars, galaxies, skulls, numbers, cartoons, or sunsets. In some embodiments, each of the first plurality of domain training images contains a representation of a human face. In some embodiments, the first plurality of domain training images consists of photorealistic images. In some embodiments, the feature vector has between 16 and 2048 elements.

In some embodiments, the input image patch is one of a set of input image patches cropped from an image such that the set of input image patches can be combined to form 80% or more of the image. In some embodiments, size and location within the image of the input image patch is randomly selected. In some embodiments, the input image patch is from a frame of a multi-frame video.

In some cases, corresponding input image patches from a stereoscopic image pair may be used to create stereoscopic mosaic images.

VI. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   an encoder artificial neural network (ANN) configured to receive an input image patch and produce a feature vector therefrom, wherein the encoder ANN has been trained with a first plurality of domain training images such that an output image patch visually resembling the input image patch is configured to be generated from the feature vector; and
   a generator ANN configured to receive the feature vector and produce a generated image patch from the feature vector, wherein the generator ANN has been trained with feature vectors derived from the first plurality of domain training images and a second plurality of generative training images such that the generated image patch visually resembles the input image patch but is constructed of newly-generated image elements visually resembling one or more image patches from the second plurality of generative training images.

2. The system of claim 1, wherein visual content of each of the second plurality of generative training images adhere to a common theme.

3. The system of claim 2, wherein the common theme is one of flowers, eyes, stars, galaxies, skulls, numbers, cartoons, or sunsets.

4. The system of claim 1, wherein each of the first plurality of domain training images contain a representation of a human face.

5. The system of claim 1, wherein the feature vector has between 16 and 2048 elements.

6. The system of claim 1, wherein the input image patch is one of a set of input image patches cropped from an image such that the set of input image patches is configured to be combined to form 80% or more of the image.

7. The system of claim 6, wherein size and location within the image of the input image patch is randomly selected.

8. The system of claim 1, wherein the input image patch is from a frame of a multi-frame video.

9. The system of claim 1, wherein the first plurality of domain training images consists of photorealistic images.

10. A computer-implemented method comprising:
    obtaining, from a memory, an input image patch;
    applying, by a processor, an encoder artificial neural network (ANN) to the input image patch, wherein the encoder ANN is configured to produce a feature vector from the input image patch, wherein the encoder ANN has been trained with a first plurality of domain training images such that an output image patch visually resembling the input image patch is configured to be generated from the feature vector;
    applying, by the processor, a generator ANN to the feature vector, wherein the generator ANN is configured to produce a generated image patch from the feature vector, wherein the generator ANN has been trained with feature vectors derived from the first plurality of domain training images and a second plurality of generative training images such that the generated image patch visually resembles the input image patch but is constructed of newly-generated image elements visually resembling one or more image patches from the second plurality of generative training images; and storing, in the memory, the generated image patch.

11. The computer-implemented method of claim 10, wherein visual content of each of the second plurality of generative training images adhere to a common theme.

12. The computer-implemented method of claim 11, wherein the common theme is one of flowers, eyes, stars, galaxies, skulls, numbers, cartoons, or sunsets.

13. The computer-implemented method of claim 10, wherein each of the first plurality of domain training images contains a representation of a human face.

14. The computer-implemented method of claim 10, wherein the feature vector has between 16 and 2048 elements.

15. The computer-implemented method of claim 10, wherein the input image patch is one of a set of input image patches cropped from an image such that the set of input image patches is configured to be combined to form 80% or more of the image.

16. The computer-implemented method of claim 15, wherein size and location within the image of the input image patch is randomly selected.

17. The computer-implemented method of claim 10, wherein the input image patch is from a frame of a multi-frame video.

18. The computer-implemented method of claim 10, wherein the first plurality of domain training images consists of photorealistic images.

19. A system comprising:
a first plurality of domain training images;
a second plurality of generative training images;
an autoencoder including: an encoder artificial neural network (ANN) configured to receive an input image patch from an image of the first plurality of domain training images and produce a first feature vector therefrom, and a decoder ANN configured to receive the first feature vector and produce an output image patch therefrom, wherein the encoder ANN and the decoder ANN are trained based on a first loss function that calculates a first difference between the input image patch and the output image patch;
a generative adversarial network including: a generator ANN configured to receive the first feature vector and produce a generated image patch from the first feature vector, and a discriminator ANN configured to receive the generated image patch and a particular generative training image of the second plurality of generative training images, and provide classifications thereof predicting whether the generated image patch belongs to the second plurality of generative training images, wherein the discriminator ANN is trained based on a second loss function that calculates a second difference between a classification of the generated image patch and a classification of the particular generative training image; and
wherein the encoder ANN is also configured to receive the generated image patch and produce a second feature vector therefrom, and wherein the generator ANN is trained based on a third loss function that calculates a third difference between (i) the classification of the generated image patch and (ii) a fourth difference between the first feature vector and the second feature vector.

20. The system of claim 19, wherein the input image patch is one of a set of input image patches cropped from the image such that the set of input image patches is configured to be combined to form 80% or more of the image.

* * * * *